Figure 1:
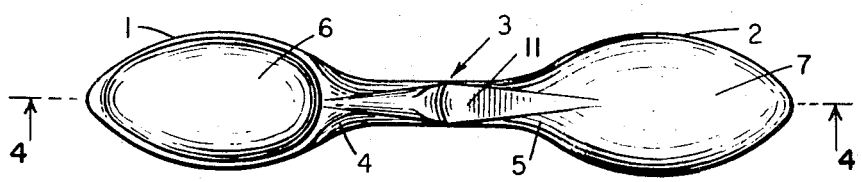

United States Patent [19]
Lamb

[11] 3,795,062
[45] Mar. 5, 1974

[54] CHILD'S HAND TRAINER

[76] Inventor: Thomas Lamb, 42 Mariomi Rd., New Canaan, Conn. 06840

[22] Filed: Sept. 20, 1972

[21] Appl. No.: 290,439

[52] U.S. Cl............ 35/29 E, 35/1, 30/322, 30/324, 46/1 R, D7/141, D7/149
[51] Int. Cl............................................ A63b 23/00
[58] Field of Search..... 35/1, 8 R, 29 R, 29 E; 30/1, 30/142, 322, 324; 15/143 R, 167 R; 272/67; D7/141, 149

[56] References Cited
UNITED STATES PATENTS

| | | | |
|---|---|---|---|
| D204,788 | 5/1966 | DeMieri | D44/29 E |
| D16,169 | 7/1885 | Murray et al. | 30/322 X |
| 2,267,670 | 12/1941 | Rosenwasser | 15/143 R |
| 2,304,319 | 12/1942 | Saltzman | 15/143 R X |
| D110,186 | 6/1938 | Lukenbill | 15/143 R UX |
| 2,505,122 | 4/1950 | Krieger | 30/1 |

Primary Examiner—Wm. H. Grieb
Attorney, Agent, or Firm—Sandoe, Hopgood & Calimafde

[57] ABSTRACT

A child's hand trainer designed to teach infants and children at an early age to use fingers and hands intelligently and usefully when handling objects comprises two symmetrical, oppositely disposed, reversely oriented implements such as spoons or forks joined together by a tetrahedral structure providing triangular surfaces which provide natural gripping surfaces for the child's thumb and fingers.

4 Claims, 7 Drawing Figures

PATENTED MAR 5 1974  3,795,062

CHILD'S HAND TRAINER

This invention relates to a child's hand trainer, designed to teach infants and children at an early age to adapt and use fingers and hands intelligently and usefully when handling objects. The contours of the trainer encourage the proper use of the fingers and thumb and the proper cooperation therebetween by guiding the fingers and thumb for gripping purposes, and thereby increasing finger dexterity. In certain forms and aspects the trainer is useful as an eating implement such as a spoon or a fork. It also may serve as an amusing toy with which the child may dig, or merely to hammer to make noise or attract attention. While designed particularly for use by infants and young children, the trainer may also be used by adults for therapeutic purposes in cases of hand injury or paralysis.

It is an object of the invention to construct the trainer in such manner as to engage a child's attention, to stimulate imagination and experimentation and to promote the child's involvement by encouraging the child to perform manipulative functions by itself in its own individualistic way.

According to the present invention the contours of the trainer are designed to discourage the instinctive tendency of the infant or small child to close the hand in a tense closed fist, and to encourage use of the thumb and fingers by the provision of surfaces which cause the child to discover their usefulness in forming two or three finger grips. The said surfaces also facilitate the child's recognition and knowledge of his tactile sense and enable him to increase the dexterity of use of the thumb and fingers. The use of the trainer enables the child to feed himself at a very early age, and later leads him to learn the manipulation of drawing and writing tools.

The trainer comprises essentially two oppositely disposed, reversely oriented implements which are joined together by a tetrahedral structure as hereinafter described with more particularity. Each half of the total comprises a complete unit which is useful alone. However, when joined together in reverse relationship the total is increasingly useful in that it can be used no matter how or where it is grasped.

Other objects and advantages of the invention will appear hereinafter.

Figure 2:
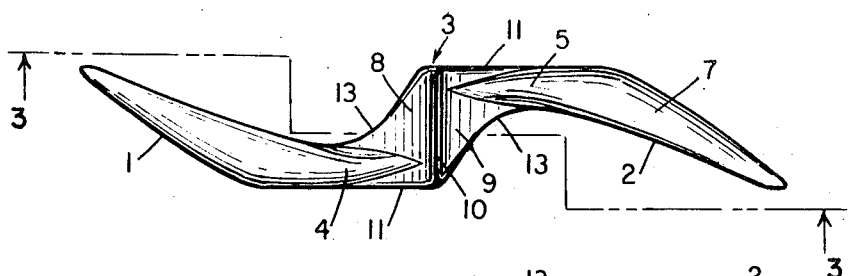
Figure 3:
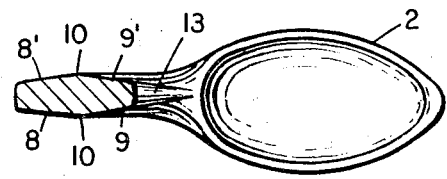
Figure 4:
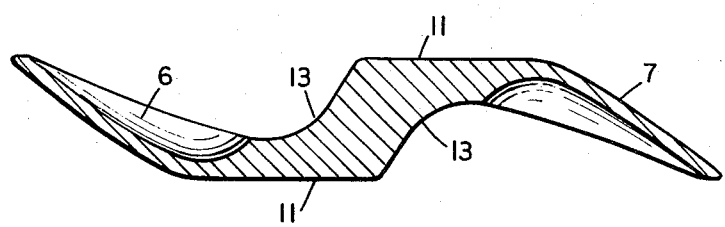
Figure 5:
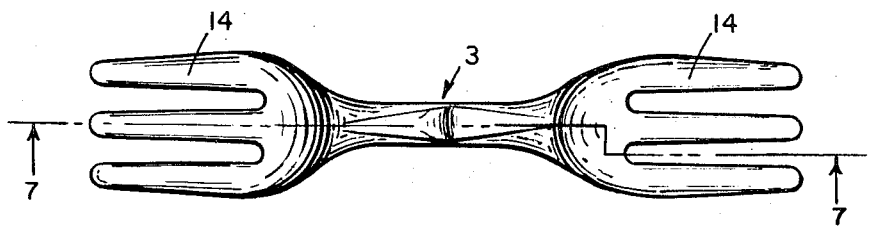
Figure 6:
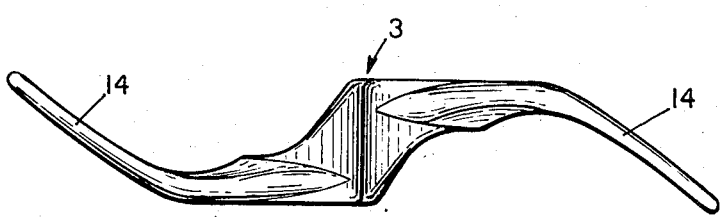
Figure 7:
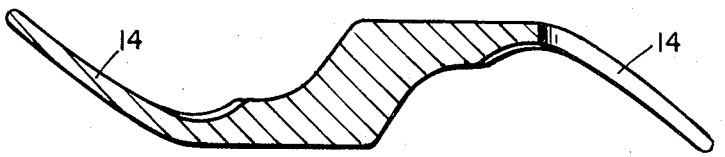

A preferred embodiment of the invention is shown in the accompanying drawings, in which, FIG. 1 is a top plan view.
FIG. 2 is a side elevation.
FIG. 3 is a section on the line 3—3 of FIG. 2.
FIG. 4 is a section on the line 4—4 of FIG. 1.
FIG. 5 is a top plan view of a modified form.
FIG. 6 is a side elevation.
FIG. 7 is a section on the line 7—7 of FIG. 5.

Referring to FIGS. 1 and 2 of the drawings, the invention is shown as embodied in a food feeding trainer having two symmetrical, oppositely disposed, reversely oriented spoon bowls 1 and 2 joined together by a tetrahedral structure 3. That is, the bowls are oppositely disposed in that they extend in opposite directions. Thus, the shank 4 of the bowl 1 is connected to the structure 3 and the bowl extends to the left thereof, while the shank 5 of the bowl 2 is connected to the structure 3, and the bowl extends in the opposite direction to the right thereof. Further, the bowls are reversely oriented in that the shank 4 is connected to the bottom of the structure 3 and the concave surface 6 of bowl 1 is right side up, in position to hold food, while the shank 5 is connected to the top of the structure 3 and the concave surface 7 of the bowl 2 is upside down.

The tetrahedral structure 3 comprises two reversely symmetrical sections, each of which comprises two substantially triangular shaped angularly disposed surfaces 8, 8' and 9, 9'. The corresponding surfaces of the respective sections, i.e., surfaces 8, 8' and 9, 9' meet at oppositely disposed, spaced ridges 10 which form one leg of the triangular surfaces. A second leg of each of the triangular surfaces is formed by the flat surfaces 11 of the shanks which are themselves triangular in shape and extend in opposite directions to merge into the convex surfaces 12 of the bowls. A third leg of each of the triangular surfaces is formed by the rounded edges 13 which join the converging surfaces 8 and 9 and 8' and 9', said rounded edges being slightly curved to merge gracefully into the respective shanks 4 and 5. The ridges 10 extend from one of the flat surfaces 11 to the other. Preferably said flat surfaces are slightly inclined to the planes of the edges of the bowls which are preferably parallel to each other, but they are substantially perpendicular to a plane through said ridges. The shanks 4 and 5 merge into the respective surfaces 8, 8' and 9, 9'.

In the use of the trainer, as the child grasps it in his hand, he instinctively and almost immediately discovers that the most comfortable way to hold it is with the convex side of one of the bowls resting against the palm of the hand with the other bowl extending away from the thumb and fingers which are automatically divided and separated by the structure 3. Then the child quickly discovers that the triangular surfaces which can be engaged by the thumb and fingers enable him to manipulate the trainer as he wishes.

It will be understood that other forms of implements may be substituted for the spoon bowls illustrated in FIGS. 1 and 2. For example, forks 14, as shown in FIGS. 5, 6 and 7 may be used, joined by the tetrahedral structure 3 as previously described.

I claim as my invention:

1. A hand trainer comprising two oppositely disposed, reversely oriented implements, and a tetrahedral structure, each of said implements having a shank connected to said structure, one at the top and the other at the bottom of said structure, said structure comprising two reversely symmetrical sections each having two triangular shaped angularly disposed surfaces.

2. A hand trainer as claimed in claim 1 in which said reversely symmetrical sections meet in oppositely disposed, spaced ridges which form one leg of the triangular surfaces.

3. A hand trainer as claimed in claim 2 in which a second leg of each of the triangular surfaces is formed by flat surfaces of said shank.

4. A hand trainer as claimed in claim 3 in which said flat surfaces are triangular in shape and are substantially perpendicular to a plane through said ridges.

* * * * *